United States Patent

Saitoh et al.

[11] 4,054,904
[45] Oct. 18, 1977

[54] VIDEO SIGNAL CODING SYSTEM

[75] Inventors: Kohei Saitoh; Hideo Akiyama; Takashi Mizuguchi, all of Tokyo, Japan

[73] Assignee: Nippon Electric Co., Ltd., Tokyo, Japan

[21] Appl. No.: 673,593

[22] Filed: Apr. 5, 1976

[51] Int. Cl.² ............................................. H04N 5/22
[52] U.S. Cl. ..................................... 358/22; 358/13; 358/19
[58] Field of Search ........................... 358/13, 19, 22; 178/69.5 CB, 69.5 DC

[56] References Cited

U.S. PATENT DOCUMENTS

| | | | |
|---|---|---|---|
| 3,647,965 | 3/1972 | Butler | 178/69.5 DC |
| 3,860,952 | 1/1975 | Tallent et al. | 358/8 |
| 3,946,432 | 3/1976 | Goldberg et al. | 358/13 |
| 3,971,063 | 7/1976 | Michael et al. | 358/8 |

OTHER PUBLICATIONS

Kiver et al., Television Simplified, Van Nostrand Reinhold Co., 1973, p. 490.

*Primary Examiner*—John C. Martin

[57] ABSTRACT

A video signal coding system includes multiple sources to load a digital version of a composite video signal into an associated storage memory. The several memories or memory portions are interrogated employing a common reference wave to obtain the stored digitized video signals in synchronism with one another.

In accordance with the principles of the present invention, feedback circuitry is employed in each digital video signal source to sample each video program in a like phase relationship with respect to the signal color burst. Accordingly, the color information is reliably preserved and is in synchronism between video programs upon signal read out from memory.

5 Claims, 12 Drawing Figures

VIDEO SIGNAL CODING SYSTEM

Detailed Description of The Invention

This invention relates to video signal processing, and more specifically to a video signal coding system for obtaining plural digital video signals which may be completely synchronized.

If mixing, keying and the like are to be effected for a plurality of digitized video signals, the video signals must be synchronized with each other. For a monochromatic video signal, it is relatively easy to bring video signals into sychronism by adjusting the delay time of a transmission path with a time delay device. In the case of color video signals, synchronization must be strictly established — even with respect to color phase. If color video signals whose color phases are not in phase are mixed, the hue would be changed. However, there has heretofore been no provision of a video signal coding system for obtaining digital video signals which are suitable for strictly controlling color phase.

It is, therefore, one object of the present invention to provide a video signal coding system for obtaining digital video signals strictly controlled regarding color phase.

Accordingly to the present invention, there is provided a video signal code system in which video signal sampling is achieved at predetermined time positions in the analog video signal (for instance, at particular cross points of color burst signals passing through zero from a negative to a positive polarity). Since at least one of the sampling points for the analog video signal is particularly designated, color phases of digital video signals which have been transmitted and received through different transmission paths can be placed in phase.

The present invention is described in greater detail hereinbelow with reference to the accompanying drawing, in which.

Figure 1:
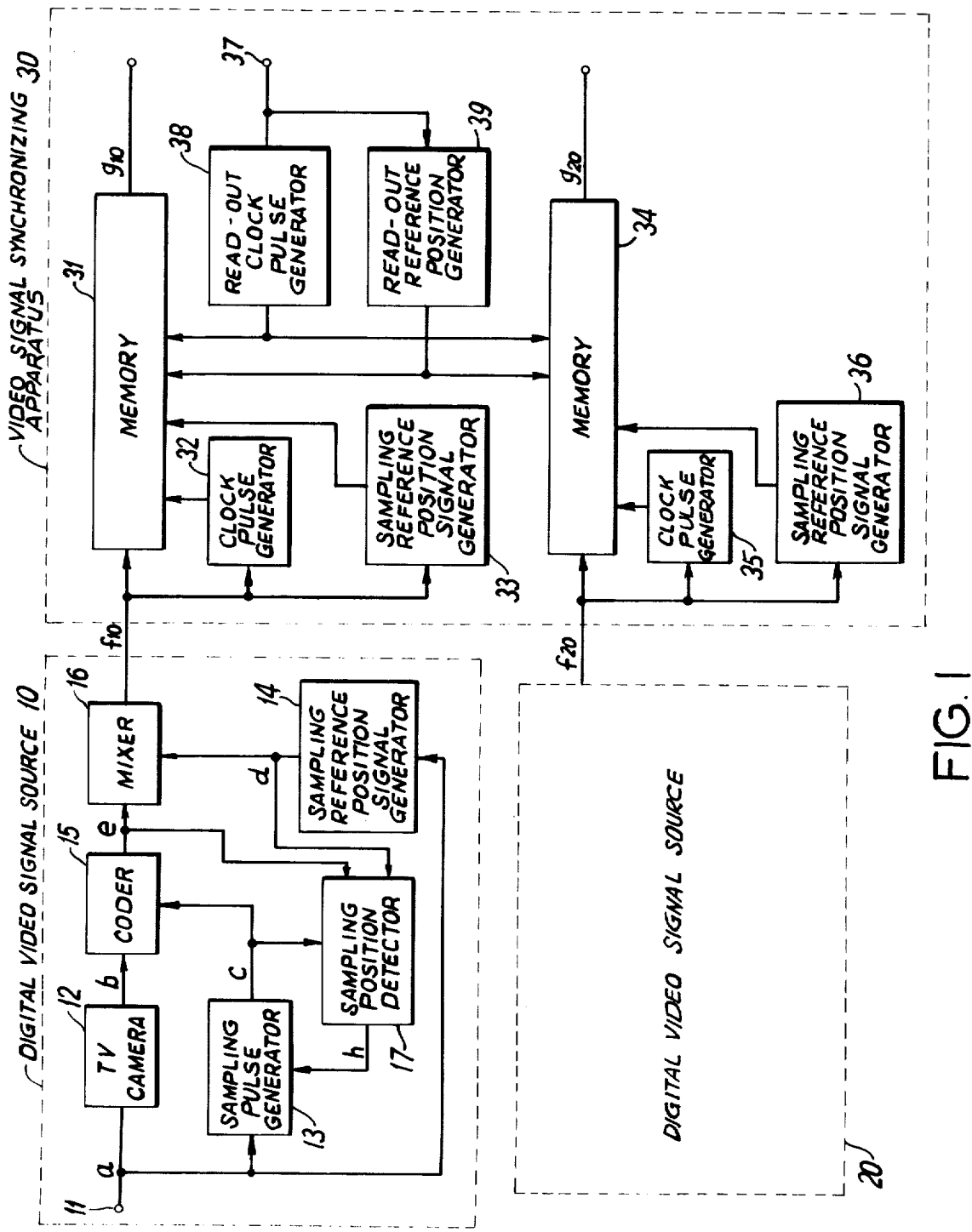
FIG. 1 is a block diagram of one preferred embodiment of the present invention.

Referring now to FIG. 1, one preferred embodiment of the present invention comprises first and second digital video signal sources 10 and 20 (e.g., of like constructions described below), and video signal synchronizing circuitry 30 for synchronizing digital video signals from the signal sources 10 and 20 with a reference synchronizing signal. Examining the first digital video signal source 10 as representative of two sources 10 and 20, a color video signal generator 12 such as a color television camera, a video tape recorder, or the like is driven by a synchronizing signal $a$ consisting of horizontal and vertical synchronizing signals and a color sub-carrier, supplied through a synchronizing signal input terminal 11, to provide an analog video signal $b$.

The synchronizing signal $a$ is also supplied to a sampling pulse generator 13 and a sampling reference time position signal generator 14. The sampling pulse generator 13 generates sampling pulses $c$ having a frequency which is an integral multiple (for example, 3 times) of the color sub-carrier frequency. The sampling reference time position signal generator 14 generates a sampling reference time position signal $d$ representing a reference address of storage means in the video synchronizing device 30. For example, the sampling reference time position signal $d$ is generated at a start point of the first cycle of a color burst signal in a particular horizontal scanning period (at a cross-point passing through zero from negative to positive polarity). In the embodiment being described, a sampling point in coincidence with, or next following the sampling reference time position signal $d$ is chosen as the reference address (0-address).

Figure 2:
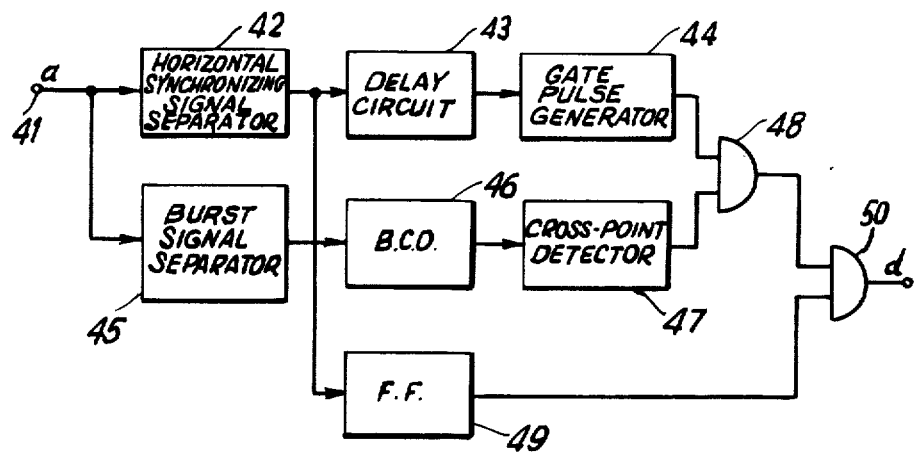
FIG. 2 is a block diagram of one illustrative sampling reference time position signal generator employed in the preferred embodiment shown in FIG. 1.

One illustrative example of the sampling reference time position signal generator 14 will now be explained with reference to FIG. 2. In FIG. 2, a synchronizing signal received at an input terminal 41 is supplied to a horizontal synchronizing signal separator 42. The horizontal synchronizing signal from the separator 42 is fed to a gate pulse generator 44 after it has been delayed be 0.006 H (the minimum interval between the horizontal synchronizing signal and the color burst signal, 'H' representing one horizontal scanning period) in a delay circuit 43. The gate pulse generator 44 generates a gate pulse which begins at the start of the delayed horizontal synchronizing signal and which has a pulse width equal to one cycle of the color burst signal. A burst signal separator circuit 45 separates the color burst signal from the synchronizing signal which is then supplied to a burst control oscillator (BCO) 46.

The BCO 46 generates a continuous wave signal (a color subcarrier signal) synchronized with the color burst signal. This color sub-carrier signal is fed to a zero crosing detector 47, which generates a zero cross-point pulse at each negative-to-positive zero crossing. The zero cross-point pulse is fed to an AND gate 48 together with the gate pulse from the gate pulse generator 44. Consequently, the AND gate 48 issues an output pulse at the start point of the first cycle of the color burst signal in every 1 H period.

The horizontal synchronizing signal from the horizontal synchronizing signal separator circuit 42 is also supplied to a flip-flop circuit 49. The flip-flop circuit 49 generates pulses having a repetition period equal to two horizontal scanning periods (2 H) and a pulse width equal to 1 H. This pulse is fed to an AND circuit 50 to gate the pulse fed from the AND gate 48, so that a sampling reference time position signal $d$ having a repetition period of 2 H at the output of the AND circuit 50 is obtained.

While the repetition period of the sampling reference time position signal $d$ is chosen equal to 2 H in the example shown in FIG. 2, this period is determined depending upon the phase relationship between the synchronizing signal of the digital video source 10 and the reference synchronizing signal of the video signal synchronizing device 30. For instance, if the video signal source 10 and the video signal synchronizing device 30 are located in the same broadcasting station so that synchronizing signals from the same synchronizing signal generator are used in the respective units, then the period can be chosen equal to 2 H because the frequencies are the same and only the phases are different between the respective synchronizing signals. Since the phase of the color burst signal relative to the horizontal synchronizing signal is inverted in every 1 H period, the period is chosen equal to 2 H to maintain the same phase. If the digital video signal source 10 and the video signal synchronizing device 30 are disposed in different broadcasting stations, then the period is chosen equal to one field, one frame or two frames as determined depending upon the capacity of the storage means (memory) in the video signal synchronizing device 30. Some correction for the sampling reference time position signal $d$ is necessary as a matter of course for this latter case.

Again referring to FIG. 1, the sampling pulses $c$ from the sampling pulse generator 13 are supplied to a coder 15 in which the analog video signal $b$ from the video signal generator is sampled and coded in response to the sampling pulses. A digital video signal $e$ from the coder 15 is fed to a mixer 16, where the sampling reference time position signal $d$ is mixed with the digital video signal $e$. In this manner, a digital video signal $f_{10}$ is derived from the first digital video signal source 10. A second digital video signal $f_{20}$ is similarly derived from the second digital video signal source 20.

The digital video signals $f_{10}$ and $f_{20}$ are furnished to the video signal synchronizing apparatus 30. The digital video signal $f_{10}$ is written into (stored in) a first memory 31. Clock pulses and a sampling reference time position signal used for this writing operation are derived from a first clock pulse generator 32 and a first sampling reference time position signal generator 33, respectively. Similarly, the digital video signal $f_{20}$ is written in a second memory 34 undr control of clock pulses and a sampling reference time position signal fed from a second clock pulse generator 35 and a second sampling reference time position signal generator 36, respectively.

A reference synchronizing signal is fed through a terminal 37 to a read-out clock pulse generator 38 and a read-out reference time position signal generator 39. Read-out clock pulses and a read-out reference time position signal for the memories 31 and 34 are respectively derived from the generators 38 and 39. Consequently, a digital video signal $g_{10}$ synchronized with the reference synchronizing signal is derived from the first memory 31. Also, a digital video signal $g_{20}$ synchronized with the reference synchronizing signal is derived from the second memory 34.

The video signal synchronizing apparatus 30 can thus provide digital video signals $g_{10}$ and $g_{20}$ generally synchronized with each other. However, since the phase relationship between the sampling pulses and the color burst signal in the video signal is not specifically determined in the digital video signal sources 10 and 20, the levels of the color burst signals sampled by sampling pulses having the same address are different between the two digital video signal generators 10 and 20. Consequently, it is impossible for the video signal synchronizing device 30 to synchronize the color burst signal phases (color phases) with each other.

Figure 3A:
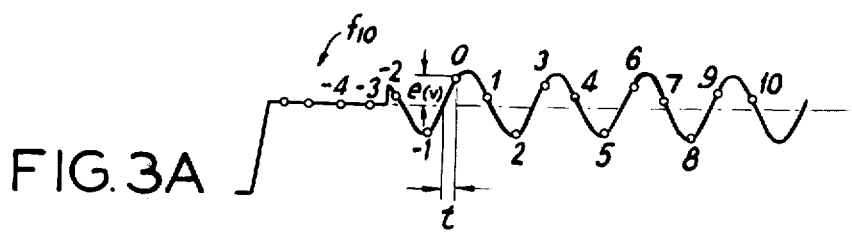
FIGS. 3A and 3B are waveform diagrams for presenting the operational principles of the present invention.
Figure 3B:
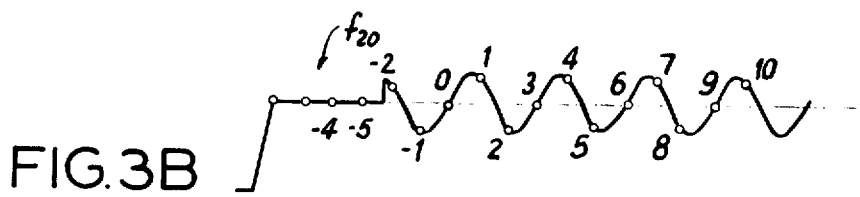

This problem will be further explained with reference to FIGS. 3A and 3B which illustrate the phase relationship between sampling pulses and the color burst signal. It is assumed that the phase relationship between the sampling pulses and the color burst signal of the analog video signal in the first digital video signal generator 10 is as shown in FIG. 3A, where the sampling point at O-address is located at a point displaced by a time interval $t$ from the first zero cross-point from the negative side to the positive side of the color burst signal. A similar phase relationship in the second digital video signal generator 20 is assumed as shown in FIG. 3B, where the sampling point at O-address is located at the first zero negative-to-positive crossing of the color burst signal. It is to be noted that small circles in FIGS. 3A and 3B represent the sampling points and numerals associated therewith represent addresses.

As will be obvious from FIGS. 3A and 3B, in the digital video signal $f_{20}$ the digital value (color burst signal level) at the O-address sampling point is at the pedestal level, whereas in the digital video signal $f_{10}$, the digital value (color burst signal level) at the O-address sampling point is at a level $e$ volt higher than the pedestal level despite the fact that the amplitude of the color burst signal is the same. In other words, the sampling time positions relative to the color burst signal are displaced by a time interval $t$. As described above, if the sampling time positions are not specifically determined but are different in every input digital video signal, then the digital levels at the same sampling time points are different even though the amplitude of the color burst signal is the same. Therefore, if these digital video signals are added at the respective like sampling time points, then the reproduced color picture is altered because a color burst signal of correct phase cannot be obtained.

In order to resolve this problem, according to the present invention there is provided structure for controlling the phase of the sampling pulses so that the pulses used to convert an analog video signal into a digital video signal will have a particular phase relationship with respect to the color burst signal in the analog video signal. In the preferred embodiment illustrated in FIG. 1, as the mechanism for controlling the phase of the sampling pulses, provision is made such that the difference between the color burst signal level at the O-address sampling time point and the pedestal level is detected by the sampling time position detector 17, and this detected level difference signal $h$ fed back to the sampling pulse generator 13 to reduce the level difference $h$ to zero. By reason of such circuitry and functioning, O-address sampling in the first and second digital video signal sources 10 and 20 is accomplished at the negative-to-positive zero cross-point (at the pedestal level) of the color burst signal. Therefore, in the video signal synchronizing device 30, the digital image signals $g_{10}$ and $g_{20}$ obtained from the memories 31 and 34, respectively, can be completely synchronized — even with respect to color phase.

Figure 4:
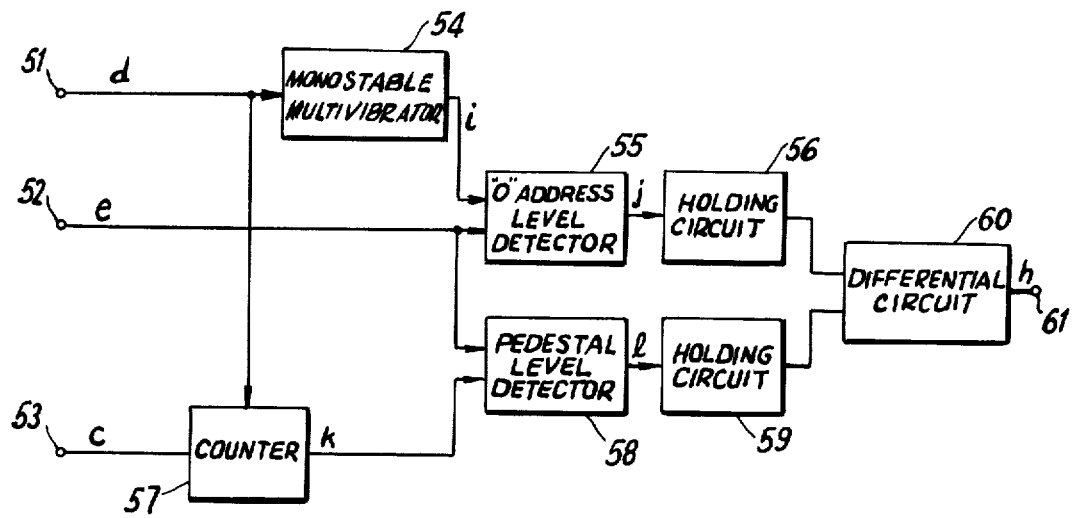
FIG. 4 is a block diagram depicting an illustrative sampling time position detector employed in the preferred embodiment shown in FIG. 1.
Figure 5A:
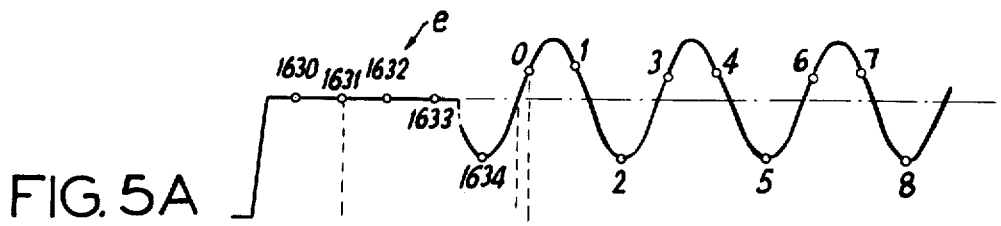
FIGS. 5A-5G are waveform diagrams showing waveforms obtaining at various circuit locations of the sampling time position detector shown in FIG. 4.
Figure 5B:
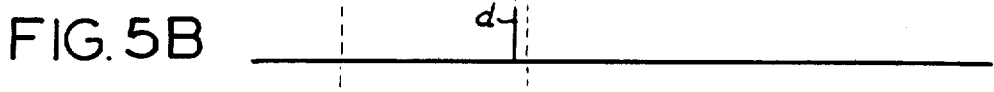
Figure 5C:
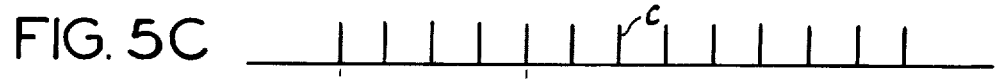
Figure 5D:
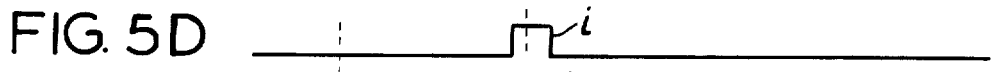
Figure 5E:
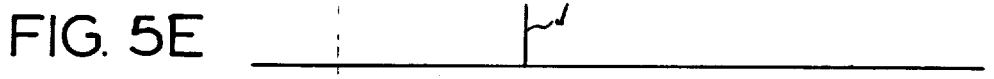

One illustrative example for the sampling time position detector 17 will now be explained with reference to FIG. 4. The sampling time position detector 17 comprises a sampling reference time position signal input terminal 51, a digital video signal input terminal 52, and a sampling pulse input terminal 53. The sampling reference time position signal $d$ received from the sampling reference time position signal generator 14 through the terminal 51, is fed to a monostable multivibrator 54. The monostable multivibrator 54 generates an O-address gate pulse $i$ as shown in FIG. 5D which begins in response to the sampling reference time position signal $d$ and which has a pulse width equal to the repetition period of the sampling pulses. This gate pulse $i$ is fed to an O-address level detector 55 to open a gate only for a time interval corresponding to the pulse width for passing the digital video signal $e$ from the terminal 52. Accordingly, at the output of the level detector 55 there is obtained an O-address level signal $j$ (FIG. 5E) representing a digital video signal level at the O-address sampling time point. This level signal $j$ is fed to a holding circuit 56 to be held for a predetermined period of time.

Figure 5F:

Sampling pulses are supplied from the terminal 53 to a counter 57. The sampling reference time position signal $d$ is applied to the counter 57 as a reset pulse. When a predetermined number of sampling pulses have been applied to the counter 57 since it was last reset by the sampling reference time position signal $d$, that is, at the time point on the back porch of the horizontal synchronizing signal in front of the color burst signal (the width of the back porch being 0.006 H), a pedestal level gate pulse $k$ (FIG. 5F) is generated. Since the pulse $k$ is to be used for detecting the pedestal level, it could be generated on the front porch as well as the back porch of the synchronizing pulse.

The aforementioned predetermined number of sampling pulses is determined in the following manner. Consider the case where the repetition period of the sampling reference time position signal $d$ is equal to 2 H and the pulse $k$ is generated on the back porch. The number of sampling pulses contained in the period of 2 H is 1365. Since the sampling reference time position signal $d$ is generated at the start point of the first cycle in the color burst signal, the time interval from the start point of the color burst to the sampling reference time position signal $d$ does not exceed a one cycle period of the color burst (corresponding to 3 sampling pulses), and also since the width of the pedestal level on the back porch is at least equal to 0.006 H (about 4.1 sampling pulses), the predetermined number could be set at 1362 ($=1365-3$).

If the pulse $k$ is generated on the front porch, since the pulse width of the horizontal synchronizing pulse is equal to 0.075 H and the width of the front porch is equal to 0.02 H, the predetermined number can be set at any arbitrary number from 1297 to 1306. Still further if the repetition period of the sampling reference time position signal $d$ is other than 2 H such as, for example, one field or one frame, then the predetermined number can be chosen accordingly.

Figure 5G:

The pedestal level gate pulse $k$ thus obtained is fed to a pedestal level detector 58 to pass the digital video signal $e$ from the terminal 52. Accordingly, a pedestal level signal $l$ (FIG. 5G) representing the pedestal level, is obtained at the output of the pedestal level detector 58. This level signal $l$ is supplied to a holding circuit 59 and held therein at least until the O-address level signal $j$ is obtained. The O-address level signal $j$ and the pedestal level signal $l$ from the holding circuits 56 and 59, respectively, are supplied to, and compared by a difference-determining circuit 60, where a level difference signal $h$ with reference to the pedestal level signal $l$ is obtained. As described previously, this level difference signal $h$ is supplied from an output terminal 61 to the sampling pulse generator 13 to control the phase of the sampling pulses $c$ to reduce the level difference signal $h$ to zero.

Accordingly, the above-described feedback loop locks the phase of the sampling pulses in each signal source to the color burst component of the video signal being processed. This permits synchronization of multiple video signals — complete to a synchronized color burst component.

The above described structure is merely illustrative of the principles of the present invention. Numerous modifications and adaptations thereof will be readily apparent to those skilled in the art without departing from the spirit and scope of the present invention.

What is claimed is:

1. In combination, plural digital video signal forming means each including source means for supplying a video signal and synchronizing information including a color burst signal, controlled sampling means connected to said source means for sampling said video signal, and means for controlling said sampling means for sampling said video signal at times dependent upon the phase of said color burst signal, said sampling controlling means in each of said plural digital video signal forming means effecting a like relationship between sampling times and color burst signal, memory means associated with each of said digital video signal forming means for storing the digital video output signals therefrom, and reference wave supplying means for supplying a read-out signal to said memory means for obtaining from said memory means plural video signals with synchronized color burst signals, wherein said synchronizing information includes horizontal blanking level pulses, and said sampling means includes feedback means including first means for sampling and storing the horizontal blanking level, second means for sampling and storing the combined level of said pulses and color burst signal, comparator means for comparing the stored contents of said first and second means and for varying the sampling time of said controlled sampling means to obviate the output of said comparator means.

2. A combination as in claim 1, further comprising at least one additional video signal forming means, memory means associated with each of said digital video signal forming means and said at least one additional digital video signal forming means for storing the digital video output signals therefrom, and reference wave supplying means for supplying a read-out signal to said memory means for obtaining from said memory means plural video signals with synchronized color burst signals.

3. A combination as in claim 1 wherein said video signal forming means further includes reference position signal generating means for periodically supplying a pulse in predetermined phase relationship with said color burst signal, coder means connected to said source means, and means for combining the outputs of said coder means and said reference position signal generating means.

4. A combination as in claim 3, wherein said feed-back means comprises a counter reset by said reference position signal generating means and advanced by said controlled sampling means for actuating said synchronizing pulse level sampling first means.

5. A combination as in claim 4, further comprising at least one additional video signal forming means, memory means associated with each of said digital video signal forming means and said at least one additional digital video signal formining means for storing the digital video output signals therefrom.

* * * * *